(12) United States Patent
Barley et al.

(10) Patent No.: US 9,993,760 B2
(45) Date of Patent: Jun. 12, 2018

(54) PARTICLE SEPARATOR SYSTEMS AND PROCESSES FOR IMPROVING FOOD SAFETY

(71) Applicant: Big Heart Pet Brands, San Francisco, CA (US)

(72) Inventors: Thomas Barley, Huntsville, AL (US); Teddy Russ, Athens, AL (US)

(73) Assignee: BIG HEART PET, INC., Orrville, OH (US)

( * ) Notice: Subject to any disclaimer, the term of this patent is extended or adjusted under 35 U.S.C. 154(b) by 25 days.

(21) Appl. No.: 14/820,742

(22) Filed: Aug. 7, 2015

(65) Prior Publication Data

US 2017/0036149 A1    Feb. 9, 2017

(51) Int. Cl.
| | | |
|---|---|---|
| *B01D 45/08* | (2006.01) | |
| *A21C 3/04* | (2006.01) | |
| *A21D 8/02* | (2006.01) | |
| *B01D 45/16* | (2006.01) | |
| *B01D 45/12* | (2006.01) | |
| *A23K 40/25* | (2016.01) | |
| *F01M 13/04* | (2006.01) | |
| *B01D 50/00* | (2006.01) | |

(52) U.S. Cl.
CPC .............. *B01D 45/08* (2013.01); *A21C 3/04* (2013.01); *A21D 8/025* (2013.01); *A23K 40/25* (2016.05); *B01D 45/12* (2013.01); *B01D 45/16* (2013.01); *B01D 50/002* (2013.01); *F01M 13/04* (2013.01)

(58) Field of Classification Search
CPC ...... B01D 45/08; B01D 50/002; B01D 45/16; B01D 45/12; F01M 13/04; A21D 8/025; A21C 3/04
See application file for complete search history.

(56) References Cited

U.S. PATENT DOCUMENTS

| | | | | |
|---|---|---|---|---|
| 732,548 A | * | 6/1903 | Guillaume ............. | B01D 3/008 261/110 |
| 960,223 A | * | 5/1910 | Guillaume ............. | B01D 3/008 261/110 |
| 1,112,860 A | * | 10/1914 | Guillaume .......... | B01F 3/04815 261/118 |
| 1,434,154 A | * | 10/1922 | San ........................ | B01D 45/08 55/436 |
| 1,896,833 A | * | 2/1933 | Svend .................... | B01D 50/00 251/127 |

(Continued)

*Primary Examiner* — Dung H Bui
(74) *Attorney, Agent, or Firm* — Michael A. Olshavsky

(57) ABSTRACT

The disclosure provides a particle separator for removing aerosolized particles from exhaust emissions from a preconditioner or other apparatus. The separator comprises an enclosure with at least two baffles linearly spaced from one another therein. At least two baffles prevent the exhaust from linearly flowing directly from an inlet through the separator to an outlet. Each baffle is positioned at an angle relative to the linear flow of exhaust into the separator and a distance from an inner surface of the separator. This places a leading edge within the exhaust flow to redirect a portion of the flow, thereby promoting impact of particles on a portion of the inner surface of the separator, while also providing a surface that collects particles in the flow that impact the baffle surface. The separator and baffle surfaces can be cleaned through an access. The separator can be box- or tube-shaped or other configuration.

17 Claims, 12 Drawing Sheets

(56) References Cited

U.S. PATENT DOCUMENTS

| | | | |
|---|---|---|---|
| 2,202,272 A * | 5/1940 | Smith | F01N 1/083 181/270 |
| 2,252,242 A * | 8/1941 | Wood | B01D 45/08 261/119.1 |
| 2,290,323 A * | 7/1942 | Graham | B01D 45/08 55/436 |
| 2,804,169 A | 8/1957 | Olah | |
| 2,896,743 A * | 7/1959 | Bradshaw | B01D 45/08 181/270 |
| 3,747,347 A * | 7/1973 | Ciraolo | F01N 1/083 55/446 |
| 3,917,458 A * | 11/1975 | Polak | B01D 46/24 110/119 |
| 4,167,987 A * | 9/1979 | Turner | F01N 1/083 181/235 |
| 4,334,897 A * | 6/1982 | Brady | B01D 53/18 261/109 |
| 4,337,069 A * | 6/1982 | German, Jr. | B01D 3/24 261/110 |
| 4,543,219 A * | 9/1985 | Yamato | B01D 3/18 261/109 |
| 4,784,674 A * | 11/1988 | Sarmiento | B01D 45/04 55/440 |
| 4,880,450 A | 11/1989 | Magol et al. | |
| 5,149,347 A * | 9/1992 | Turner | B01D 45/08 55/446 |
| 5,435,820 A | 7/1995 | Daum et al. | |
| 5,809,940 A | 9/1998 | James et al. | |
| 5,882,386 A * | 3/1999 | McAferty | B01D 53/26 55/385.4 |
| 6,193,774 B1 * | 2/2001 | Durdag | B01D 45/08 34/77 |
| 6,217,922 B1 | 4/2001 | Munz | |
| 6,312,504 B1 * | 11/2001 | Both | B01D 45/08 55/385.5 |
| 6,391,094 B2 * | 5/2002 | Ramos | B01D 19/0042 95/248 |
| 6,648,939 B2 | 11/2003 | Neuschwander et al. | |
| 7,793,758 B2 * | 9/2010 | Rimback | F01N 1/02 181/247 |
| 7,927,404 B2 * | 4/2011 | Kemoun | B01J 8/226 422/147 |
| 7,951,217 B2 | 5/2011 | Blake et al. | |
| 8,083,824 B2 | 12/2011 | Fujiyama et al. | |
| 8,097,053 B2 | 1/2012 | Kaidalov et al. | |
| 9,005,340 B2 * | 4/2015 | Azwell | B01D 46/2403 55/320 |
| 2006/0096259 A1 * | 5/2006 | Meerpohl | B01D 29/01 55/482 |
| 2011/0247497 A1 * | 10/2011 | Karvinen | B01D 45/08 95/272 |
| 2014/0109533 A1 * | 4/2014 | Horiuchi | F01M 13/04 55/430 |

\* cited by examiner

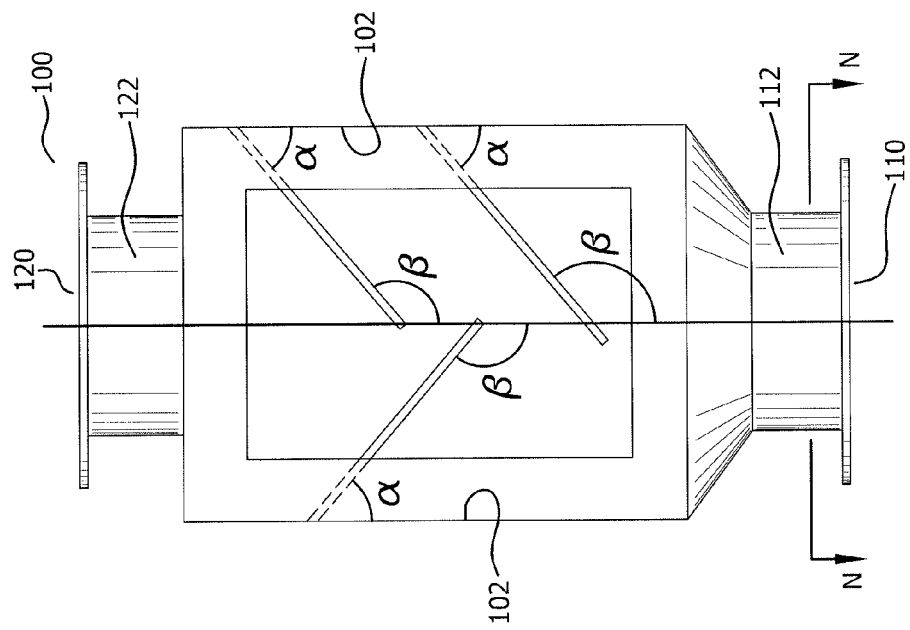
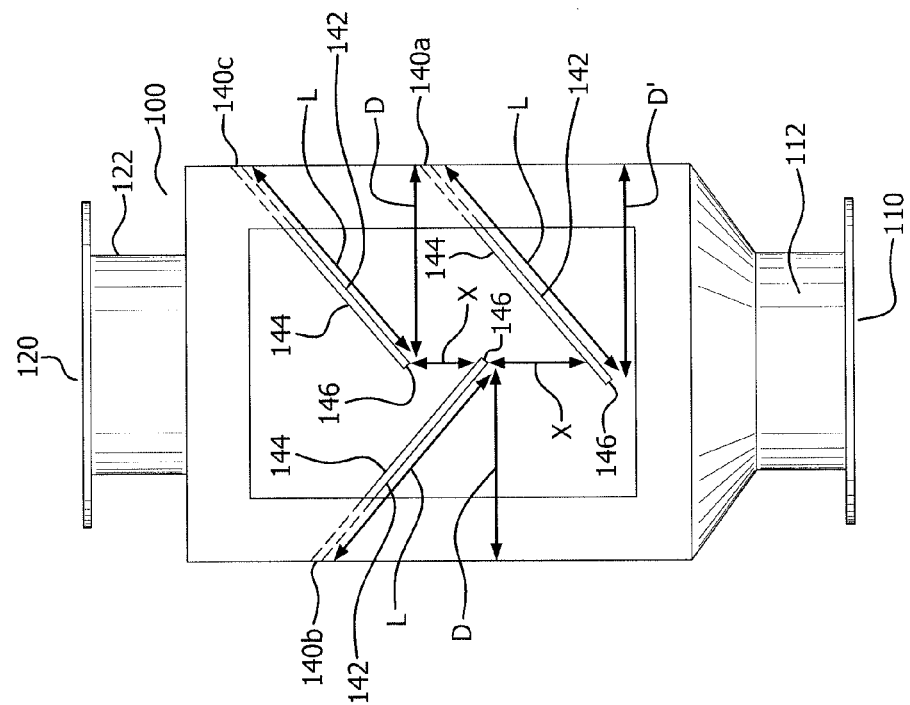

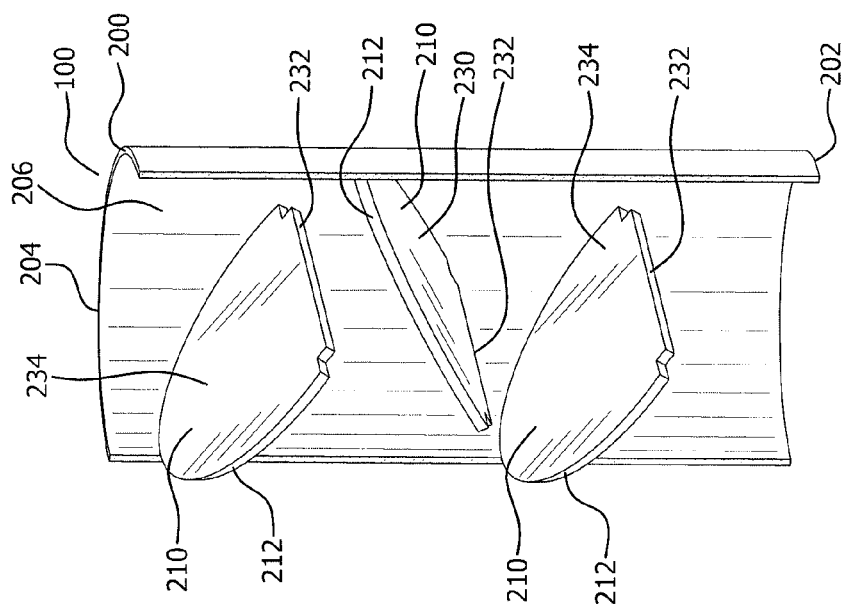
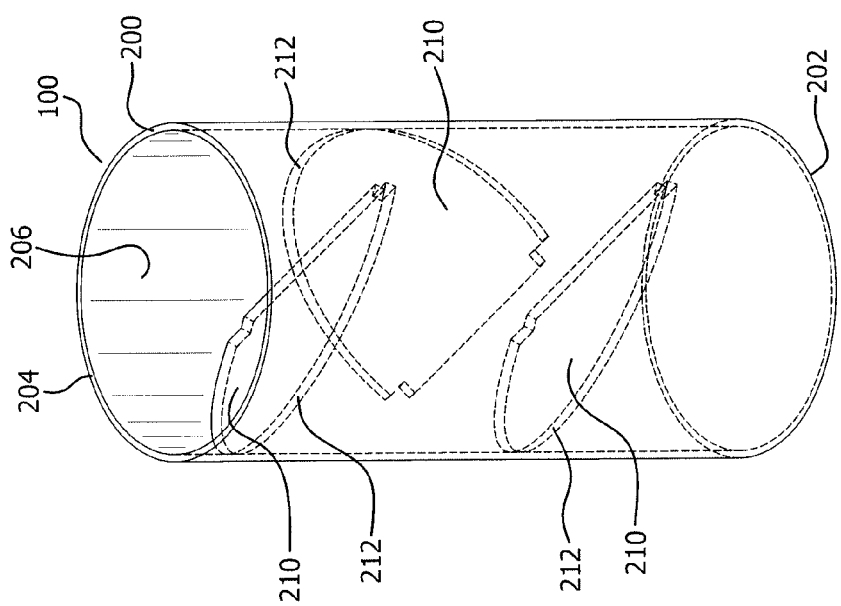

PARTICLE SEPARATOR SYSTEMS AND PROCESSES FOR IMPROVING FOOD SAFETY

FIELD OF THE INVENTION

The invention relates generally to the field of exhaust vent management systems for food and other processing or industrial machinery that produce dry or steam exhaust emissions commingled with any size of particulate matter. More specifically, the invention is concerned with removing particulate matter from exhaust vents of extruders, such as those operating relative to a preconditioner, whereby a device removes particulates from steam exiting a preconditioner to reduce contamination and other problems caused by exhausting damp particulate matter into the environment of the extrusion operation. The invention is also concerned with improving food production processes and the end product thereof.

BACKGROUND OF THE INVENTION

A preconditioner is an apparatus widely used in combination with an extruder or feed pellet mill to manufacture food products, such as, for example, flakes or pellets for cereals and snacks, pet food, pet treats, and fish feed. A preconditioner heats, hydrates, and mixes the dry raw materials (e.g., protein, fat, starch, etc.) before extrusion or milling and automatically doses the pre-treated product into the processing apparatus, e.g., extruder or feed pellet mill. A preconditioner can also be used to partially cook the starting ingredients prior to extrusion. For example, starting ingredients typically have a relatively high percentage of powdered or ground ingredients, e.g., flour-like material such as corn or wheat, that require blending with water and/or treatment with steam in the preconditioner to facilitate downstream extrusion or milling. The use of a preconditioner is advantageous in preparing products comprised of farinaceous material, such as pet food or treats, containing a relatively large percentage of flour and other ground ingredients.

Generally, a preconditioner includes injection ports for introducing steam and/or water into the chamber of the preconditioner to be mixed with other starting ingredients with mixing paddles, counter-rotating screws, or other mixing devices during processing in the preconditioner. The steam may be pressurized to about 30-80 psi prior to injection into the preconditioner. The combination of energy (thermal and mechanical) in the preconditioner can be used to partially cook ingredients and even to pregelatinize starch in the preconditioner.

The pressurized steam must condense in the preconditioner to be effective. Typically, a portion of the pressurized steam exits the preconditioner as "blow out" through a vent that exhausts a gaseous mixture to prevent the buildup of undesired pressure in the preconditioner. The gaseous mixture can include steam, air, and particulate matter comprising the starting ingredients that become aerosolized by and with the steam.

The manufacturing operations for pet and human food includes blending of raw material (dry and wet) prior to heat treatment. In general, most food formulations include grains, e.g., corn, wheat, and their products such as gluten. Some of these ingredients may be contaminated with or contain naturally-occurring pathogens, bacteria, toxins and/or mold that are known to cause illnesses. For example, meat meal and animal proteins can be contaminated with *Salmonella*, *Staphylococcus*, and *Coliform* bacteria such as *E. coli*. Cereal grains (corn, wheat, and their products), legumes (peanuts), and oilseeds may be contaminated with fungi or molds that product toxins, such as aflatoxin produced by *Aspergillus*.

One function of an extruder is to quickly cook and pasteurize the food or feed at temperatures high enough to kill a majority of the microbes and destroy toxins present in the starting ingredients. Preconditioning the starting ingredients can start the kill process for microbes and/or destroy toxins. However, the introduction of pressured steam and/or water into the wet and dry starting ingredients can create blow off in the form of preconditioner exhaust. This exhaust can contain contaminated starting materials and dust that are hosts for pathogens that can survive for up to 300 days. This exhaust is typically not exposed to a high temperature kill step to destroy toxins or to kill microorganisms.

The handling of the preconditioner exhaust is a problem throughout the pet and human food processing industry. If the exhaust is untreated, which has been a common approach in the industry, then it will be dispersed throughout the production facility and settle on and coat the surfaces of the production machines, pipes, floor and other exposed surfaces in the facility. The commingling of steam with proteinaceous particulate matter and other starting ingredients provides ideal conditions to support microbial growth as those microbe(s) and their by-products are exhausted with the steam into the processing facility and deposits on surfaces. The moisture creates conditions that promote the growth of microbes that are dispersed with the exhaust, as well as other microbes, such as fungus, mold, or bacteria, that are present in the processing environment. Any toxins, e.g., aflatoxin, that may be present in the starting ingredients may also be aerosolized by the exhaust and disbursed throughout the processing environment.

The spread of microbes and toxins by the exhaust poses a food safety concern because the finished product, which is produced in the processing environment, can become contaminated through exposure to the microbes and/or toxins.

Other concerns include workplace safety. Plant operators can become ill through exposure to microbes and/or toxins exhausted into the processing environment. Additionally, the moist coating is slippery and creates a hazardous work environment that must be constantly maintained in order to avoid workplace injury. Finally, the moist coating can also cause corrosion of the processing machines and other surfaces.

Management systems for preconditioner exhaust have been developed for processing or collecting vent exhaust. These systems include collection bags, fan suction with centrifugal separators, cooling systems combined with increased diameter vent pipes, confined space such as a closed-off room to collect exhaust, and water scrubbers. All of these systems have significant limitations for a variety of reasons that include high cost or ineffective or inefficient systems. For example, baghouse collectors have been used unsuccessfully with vent stacks to filter particulate matter from the steam using a fabric filter. The particulate matter and steam form a mud-like material that clogs the filter and renders the collector ineffective for managing vent exhaust.

An alternative system implementing wet centrifugal collectors (RotoClone) centrifugally separates the exhaust into water and particulate matter and then separately collects the water and particulate matter. This type of collector introduces exhaust into a chamber having a fan or impeller that separates the exhaust into water disposed of with a drain and particulate matter disposed of in a separate chute. This collector system is inefficient because the disposal drain and chute routinely clog and require constant maintenance to prevent back up of the collector.

A further approach to managing vent exhaust uses a cooling system that operates as a condenser with a large-diameter pipe vent. When the steam cools, water along with particulate matter condenses onto the vent pipes and then drains back into the preconditioner. This system fails to treat all of the exhaust because a significant amount of steam with particulate matter does not condense and vents into the processing machinery environment. This system also requires additional utilities to operate and support the cooling system.

Another solution vents exhaust directly into a confined space such as a room. This produces similar problems as direct venting exhaust into a production facility.

Water scrubbers have been explored as a possible alternative solution for managing vent exhaust. In one type of water scrubber, water nozzles spray water into the exhaust flowing in the vent to disrupt the flow of steam and particulate matter. This causes water and particulate matter to collect in the vent pipe and then return to the preconditioner and alter the composition of the preconditioned material. Water scrubbers also require additional utilities to manage water flow to the scrubber.

Outside the field of food processing equipment, other systems have been used to remove ultra-fine particles and water droplets present in a gas stream flowing in an industrial process. For example, some centrifugal collectors use cyclonic action to separate dust particles or water droplets from the gas stream. In a typical cyclone, the dust gas stream enters a funnel-like, cyclonic container at an angle and is spun rapidly. The centrifugal force created by the circular flow directs the dust particles toward the wall of the cyclone. After striking the wall, these particles fall into a hopper located underneath the collector. The most common types of centrifugal collectors in use today are: single-cyclone separators, multiple-cyclone separators, and secondary-air-flow separators. These systems are used for removing ultra-fine particulate matter from dry gas streams.

Impact separators are another type of system used to remove ultra-fine particles and water droplets present in a gas stream flowing in an industrial process. Impact separators use fixed plates or L-shaped or U-shaped bends in tubing that causes the conveying gas stream to make a sudden change of direction. Particles and water droplets do not follow the gas stream because either inertia carries them into a surface of the separator or the gas stream becomes turbulent and slows in a dead air space. In either case, the particles and/or water fall out of the flowing gas stream. Impact separators are typically used as precleaners for industrial operations and are intended for use in removing ultra-fine, but not course, particulate matter from dry gas streams. Impact separators remove particles with high inertia or low drag from the gas stream, but low inertia or high drag particles remain in the gas stream line and continue to flow with the gas which must be passed through a filter(s). This system would not work effectively with a water saturated exhaust vented from a food processing operation.

The subject matter disclosed herein provides a particle separator apparatus, and methods of use thereof, that: (1) cleans exhaust steam or gas by removing at least 80% or more particulate matter flowing in the exhaust; (2) is a low cost alternative to more expensive vent management systems; (3) is easy to clean and does not clog readily during day-to-day use; (4) provides an easy fit with existing vent stacks used with food processing equipment; (5) reduces sanitation costs by significantly reducing, if not eliminating, the settlement of blow off on surfaces in the process operation environment, and potential contamination by microbes and their by-products (e.g., toxins) by removing uncooked meat particulates and other ingredients, as well as microbes and their by-products (e.g., toxins) from the exhaust; (6) reduces workplace hazards by significantly reducing or eliminating blow off of wet exhaust into the processing operation environment; (7) reduces the corrosion of processing equipment, e.g., extruders, pipes, etc.; (8) reduces risk of contamination of food products that would result from microbes, such as *Salmonella*, and their by-products, such as toxins, that settle on intermediate or finished food products; (9) reduces energy use by the processing equipment by increasing the retention time of heat (steam) in the preconditioner by restricting steam flow in the exhaust; (10) increases the quality of finished product by reducing variations in processing temperatures in the preconditioner; (11) has no moving parts or requirements for utilities (e.g., electricity, gas, plumbing) which reduces risk of system failure to machine design and risk in the production flow; and (12) is self-cleaning.

The subject matter disclosed herein improves upon or overcomes one or more of the shortcomings of solutions proposed for managing vent exhaust from food processing machines.

BRIEF DESCRIPTION OF THE FIGURES

Additional aspects, features and advantages of the invention, as to its structure, assembly and use, will be understood and become more readily apparent when the invention is considered in light of the following brief description of the figures made in conjunction with the accompanying drawings, wherein:

FIGS. 2a and 2b show a front plan view of the particle separator shown in FIG. 1 (without the door), while

FIG. 7 shows a perspective view of an alternative embodiment of the particle separator.

FIG. 8 shows a cutaway view of an alternative embodiment of the particle separator.

BRIEF DESCRIPTION OF THE INVENTION

Figure 1:
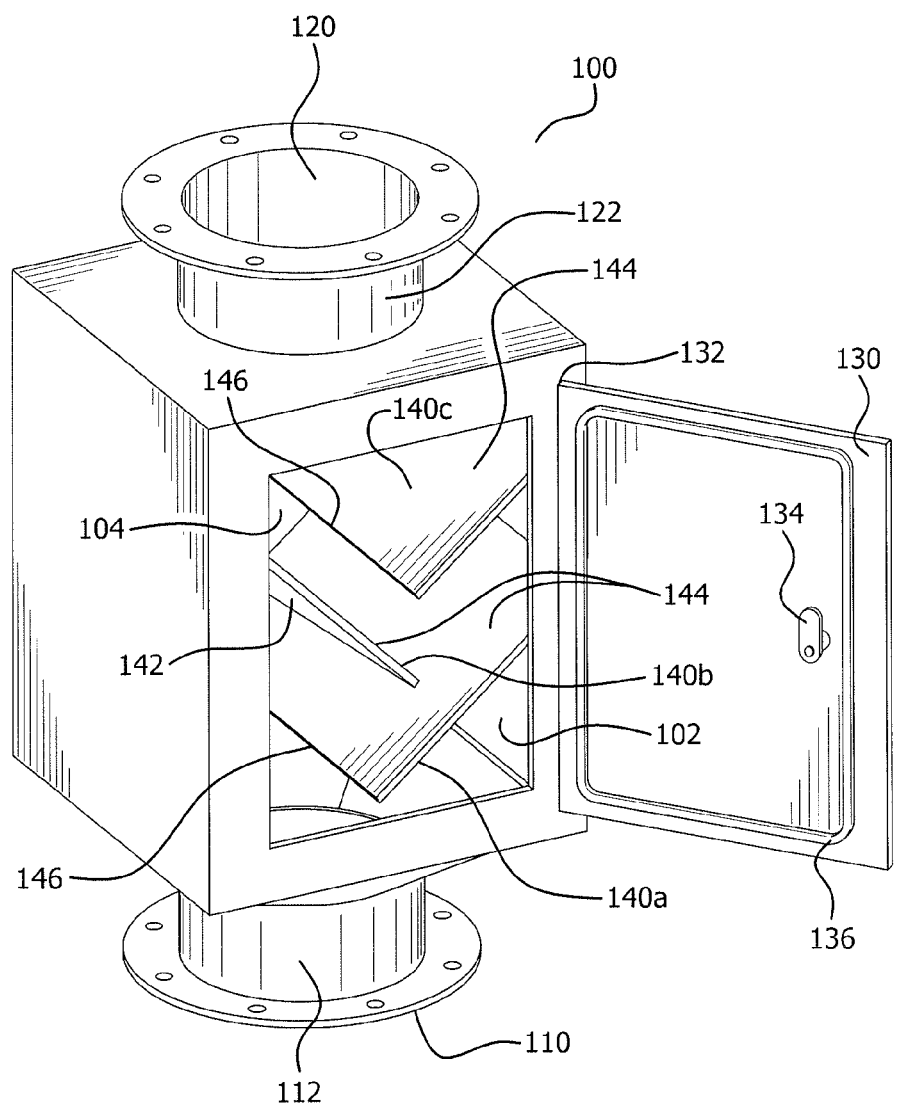
FIG. 1 shows a front perspective view of the particle separator of the present invention with its door open.

Illustrative and alternative embodiments of a particle separator 100 for cleaning vent exhaust from food processing operations are described in detail with reference being made to the figures of this application. Although similar aspects of embodiments are featured throughout this disclosure and are readily apparent, these similarities may be repeated within the context of the various embodiments of the invention.

The term "particle" or "particles" means any wet or dry piece of matter that can travel within a gas flow and can range in size from a nanoparticle to a macroparticle.

The term "exhaust" means any combination of gas, steam and/or particles that exit and/or flow within a preconditioner, extruder or other food processing apparatus, or other apparatus or equipment having a gas flow operation.

The particle separator 100 provides technology for removing aerosolized particulate matter from exhaust produced in a preconditioner for an extruder (Wenger, ExtruTech, Ever Extrude, Horizon) or other operation during food production. The particle separator 100 is an optimized, high performance vent management system that separates particles from a flow of exhaust by directing uncooked or partially-cooked particles into an array of linearly-spaced baffles that divide and redirect a flow of exhaust around the baffles. The capacity to handle a high volumetric flow rate, e.g., about 120-220 CFM or higher, from standard exhaust tubes, e.g., 6-, 8-, and 10-inch tubes, used with food processing equipment, when combined with ease of use and effectiveness, makes the particle separator 100 a practical solution to the problems that exist with other technologies used to scrub vent exhaust. No significant backpressure, if any, is created by the particle separator 100 during operation.

The particle separator 100 incorporates an array of baffles to divide and redirect the entire flow of particle-laden exhaust while removing particles therefrom. In the particle separator 100 shown in FIGS. 11a, 11b, and 12, which defines an enclosed space 104 having inlet 110 and outlet 120 openings, particle-laden exhaust is fed by a vent through the inlet 110 and directed into at least two linearly-spaced baffles 140a, 140b. The particle-laden exhaust encounters a first baffle 140a having a leading edge 146 that divides the flow of exhaust and redirects a portion of the flow into and along an upstream surface 142 of the baffle 140a, while the other portion of exhaust flows linearly past the first baffle 140a. The first baffle 140a provides an intercept surface—upstream surface 142—with which particles impact as a result of inertia and collect during operation of the particle separator 100. The exhaust becomes turbulent as it is redirected by the first baffle 140a into an inner surface 102 of the particle separator 100 and then either recirculates with the flow of exhaust upstream from the first baffle 140a or circulates within lateral spaces of the particle separator 100 and flows downstream from the first baffle 140a.

Figure 11A:
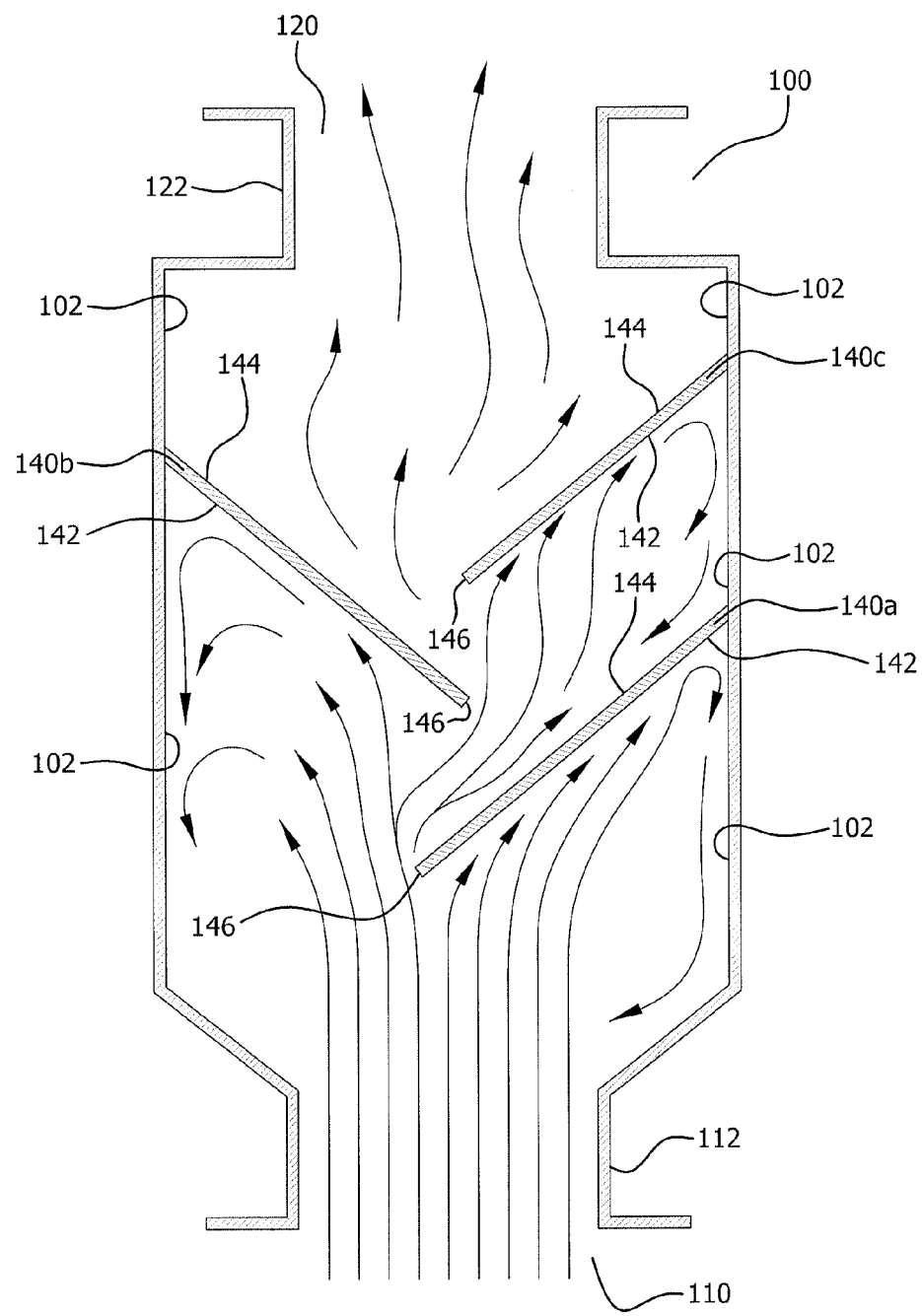
FIG. 11a shows an airflow schematic in a cross-sectional view of the particle separator shown in FIG. 1.
Figure 11B:
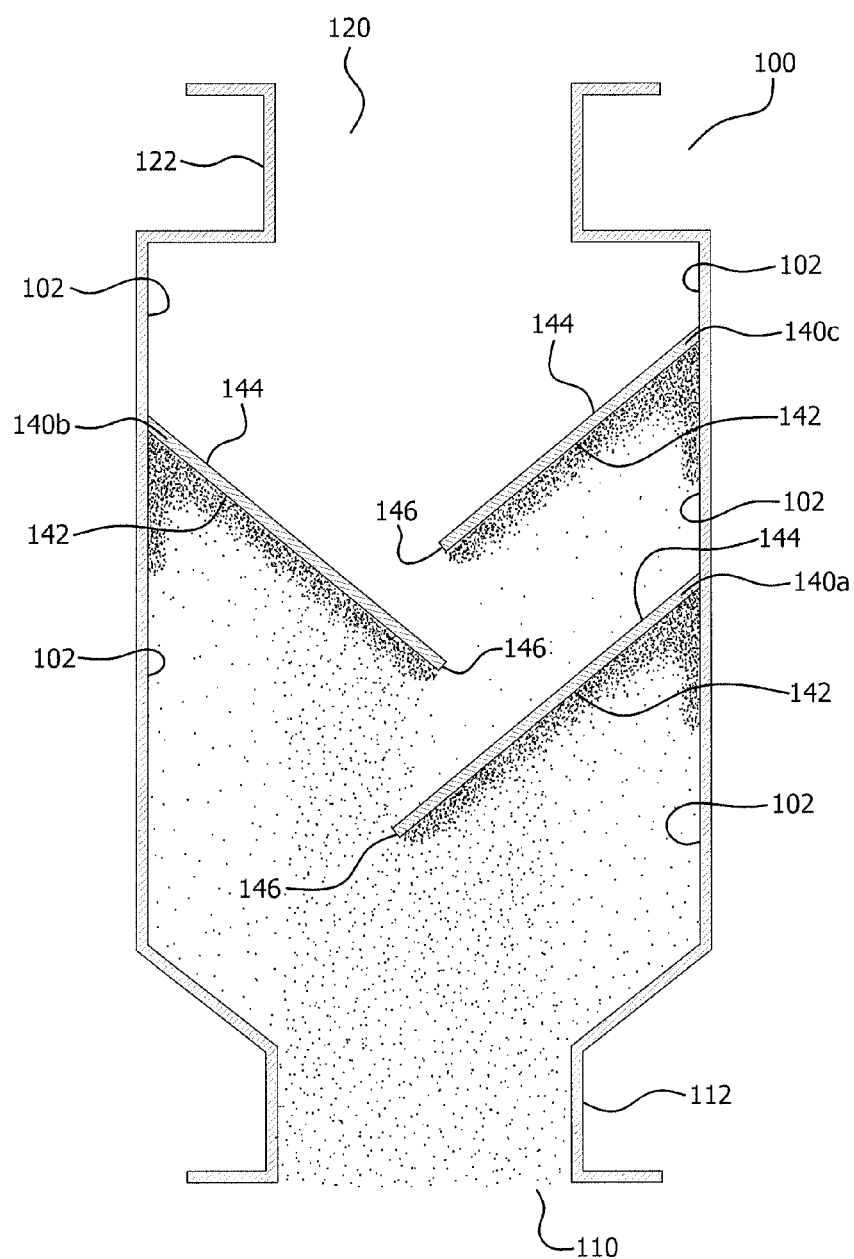
FIG. 11b shows a schematic of the density of particles in exhaust flowing through the particle separator, as well as the general location of particle deposition on the surfaces of the baffles and inner walls of the particle separator.
Figure 12:
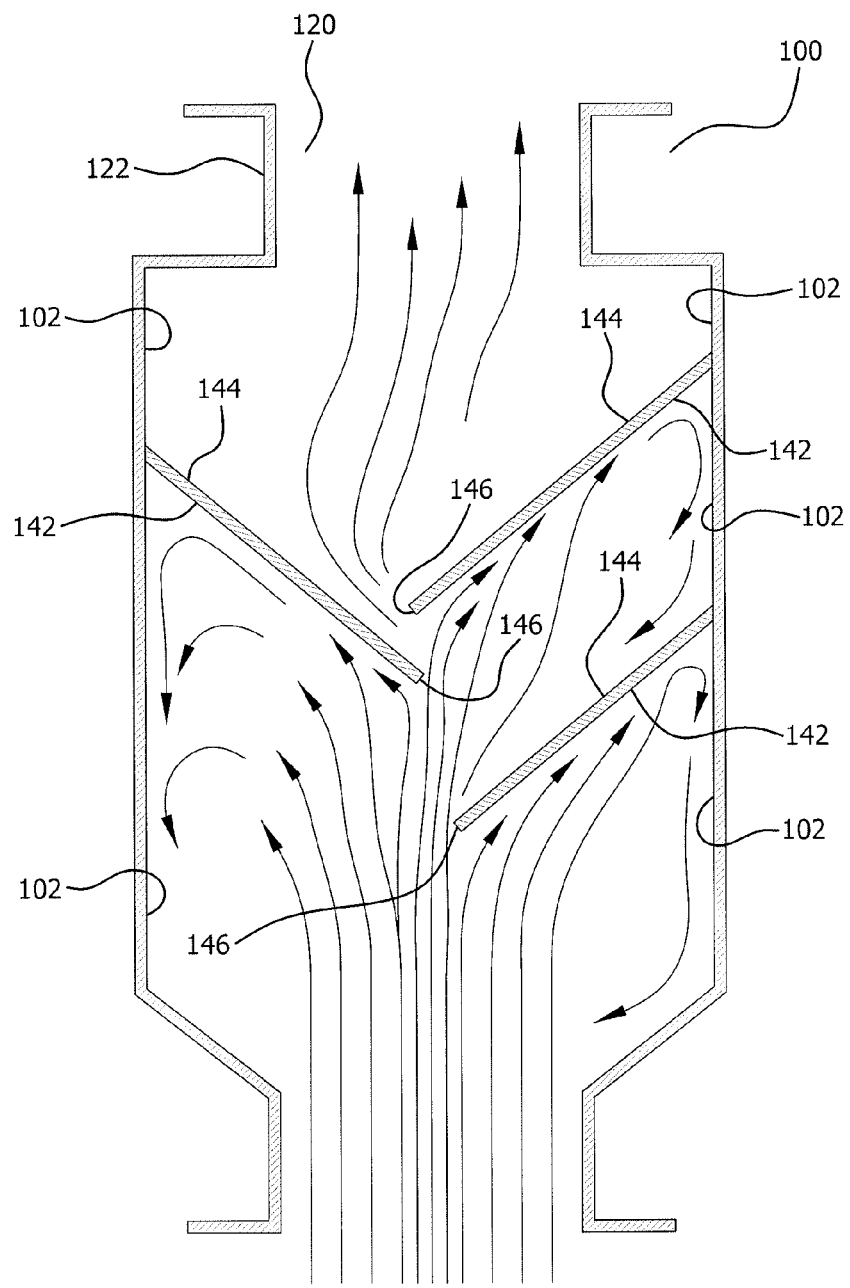
FIG. 12 shows an airflow schematic in a cross-sectional view of an alternative embodiment of the particle separator.

Referring now to FIGS. 11a, 11b, and 12, the particle-laden exhaust, which flows linearly past the first baffle 140a without being redirected by it, encounters a second baffle 140b downstream from the first baffle 140a. The second baffle 140b provides an intercept surface—upstream surface 142—into which particles impact due to inertia and collect. The second baffle 140b also redirects the flow of exhaust into an inner surface 102 of the particle separator 100. The exhaust becomes turbulent as it is redirected by the second baffle 140b and then either flows downstream from the second baffle or recirculates with the flow of exhaust upstream from the second baffle 140b.

Referring now to FIGS. 11a and 11b, the first baffle 140a and the second baffle 140b prevent linear flow of exhaust from the inlet 110 to the outlet 120 by dividing and redirecting the entire flow of particle-laden exhaust before passage of the exhaust through and out of the outlet 120 of the particle separator 100. One or more baffles, e.g., third baffle 140c (shown in FIGS. 11a and 11b), may be provided downstream from the first baffle 140a and second baffle 140b in the particle separator 100. The additional baffle(s) also function to redirect exhaust circulating within the particle separator 100, as well as collect particles that deposit on the surfaces of the baffle(s) and inner surface 102 of the particle separator 100. There is no limitation on the size of particle—large or small—that the particle separator 100 can remove from exhaust before the exhaust exits from the particle separator 100.

Figure 2C:
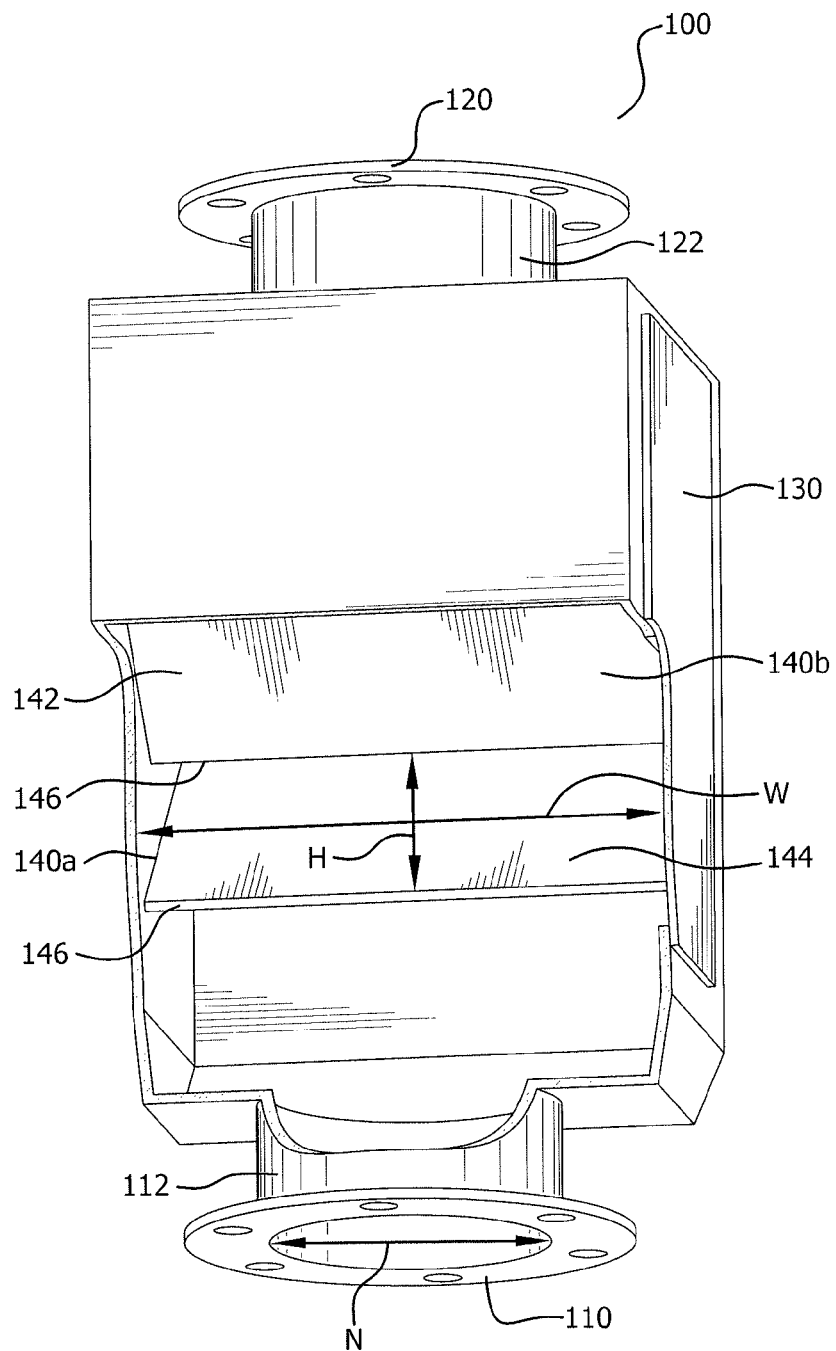
FIG. 2c shows a cutaway view of the particle separator of FIG. 1.
Figure 3:
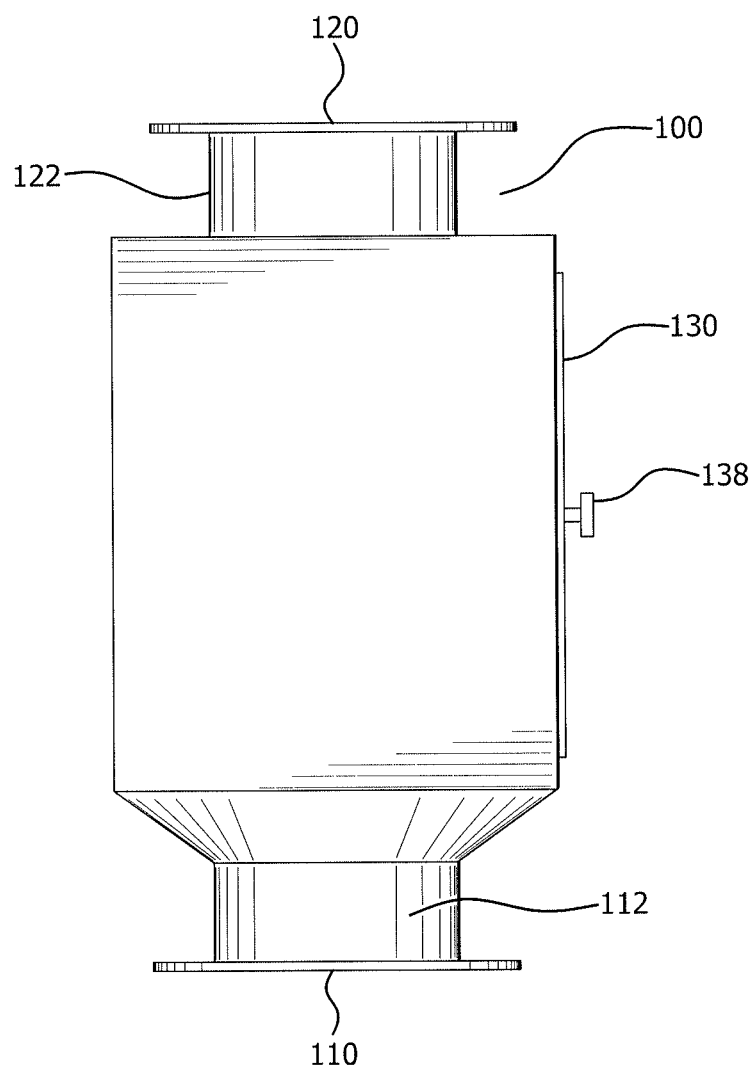
FIG. 3 shows a side plan view of the particle separator shown in FIG. 1.

FIG. 2a shows the baffles linearly spaced from one another at a distance X. Distance X is configured to prevent the particle-laden exhaust from simply being slightly diverted by the baffles while flowing through the particle separator 100. Rather, distance X is configured so that the baffles divide and redirect the entire flow of exhaust entering through the inlet 110, thereby promoting the impact of particles on the upstream surface 142 of at least one of the baffles 140a, 140b, 140c. In an embodiment, the distance X is less than the diameter of the tube 112 or the width of the opening of an inlet into the particle separator 100.

The volumetric flow rate (about 120-220 CFM) of exhaust entering the particle separator 100 can also play a role in determining distance X. In an exemplary embodiment, the area of the opening (width W by height H, see FIG. 2c) between the leading edges 146 of two sequential baffles 140a, 140b can be about 65-100% of the cross-sectional area of the inlet 110 receiving exhaust from a preconditioner or other equipment from which the exhaust is being vented. In embodiments where the area of the opening between the leading edges 146 of two sequential baffles 140a, 140b is restricted to less than 100% of the cross-sectional area of the inlet 110 (which can be determined using diameter N, see FIG. 2c), then the Venturi effect will cause the flow of exhaust including any particles to accelerate as it passes through the opening between the leading edges 146 of two sequential baffles 140a, 140b.

In various embodiments, the upstream and downstream surfaces 142, 144 of the baffles and, optionally, the inner surface 102 of the particle separator 100, may have a coating. For example, a rough coating may be applied to the upstream and/or downstream surfaces of baffles 142, 144 and, optionally, the inner surface 102. A purpose of the rough coating (Stove Bright 1PC-653-Series, 1IP-653-Series Forest) will be to capture and hold particulate matter on the surfaces 142, 144 of the baffles and, optionally, the inner surface 102. Alternatively, a slick coating (Du Pont Silver stone Teflon ((polytetraflouroethylene (PTFE) or fluorinated ethylene propylene (FEP)) may be applied to the upstream and/or downstream surfaces 142, 144 of the baffles and, optionally, the inner surface 102. The purpose of the slick coating in combination with the angle α of a baffle promotes water and particles to collect on the surfaces 142, 144, 102 and then slide off those surfaces and fall back into the preconditioner. Of course, the surfaces, e.g., upstream 142, downstream 144, and inner 102, may all have the same type of coating or a combination of different coatings. By way of a non-limiting example, the upstream surface 142 may have a rough coating, while the downstream surface 144 and inner surface 102 may have a slick coating.

In various embodiments, the upstream and downstream surfaces 142, 144 of the baffles, as well as, optionally, the inner surface 102 of the particle separator 100, may have channels etched into those surfaces or defined by raised portions of material affixed to the surfaces to collect and direct moisture and particles to flow off of the surfaces 142, 144, 102 and back into the preconditioner or into a drain or other communication.

Figure 4:
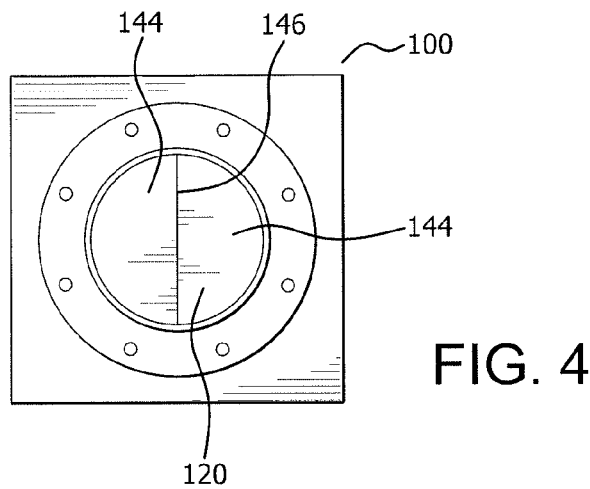
FIG. 4 shows a top view of the particle separator in FIG. 1.
Figure 5:
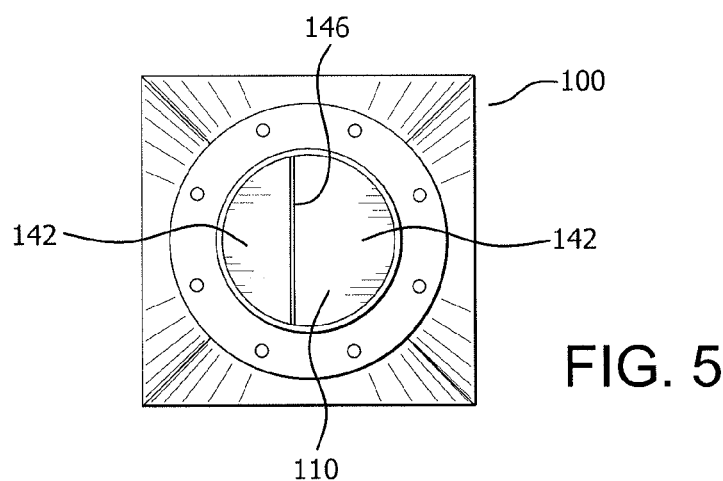
FIG. 5 shows a bottom view of the particle separator in FIG. 1.
Figure 6:
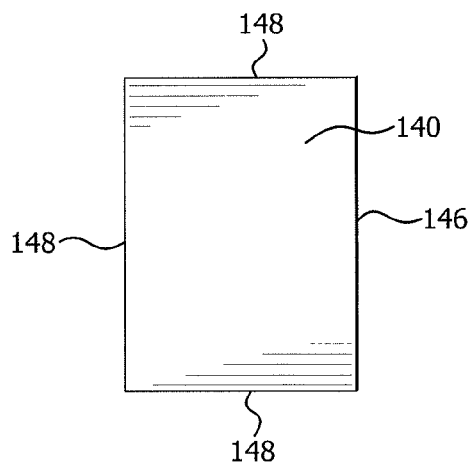
FIG. 6 shows a top view of a baffle used with the particle separator shown in FIG. 1.

In embodiments, the leading edge 146 can be linear as shown in FIGS. 1, 4-5, linear with one or more cutaways as shown in FIG. 8, curvilinear, v-shaped, or other linear or curvilinear edge, or combination thereof. In any of the aforementioned embodiments, the leading edge can also be notched by linear and/or curvilinear cutouts. The leading edge may include any one or more extensions in any geometric shape that project further into the flow of exhaust to create additional turbulence, as well as provide an impact surface to remove particles from the exhaust.

FIGS. 1-2 show a particle separator 100 with an open door 130 providing access to the enclosed space 104 and baffles. The particle separator 100 has an inlet 110 and an outlet 120. The inlet 110 provides an opening for particle-laden exhaust to be fed into the particle separator 100 from a preconditioner vent or other source of exhaust. The inlet 100 may include a tube 112 with a length sufficient enough to be attached by bolts or other fasteners with an optional flange that may be sealed to a vent pipe on its upstream end and the particle separator 100 on its downstream end. The cross-sectional size and shape of the tube 112 is not critical so long as it fits the vent pipe and can be secured thereto. The outlet 120 provides an opening for exhaust to exit the particle separator 100 after passing by the array of baffles. The outlet 120 includes a tube 122 to direct the exhaust exiting the particle separator 100. The cross-sectional shape, size and length of the outlet 120 is not critical, but can be configured in such a manner to connect with additional pipes and/or one or more downstream particle separator(s), stack(s), filter(s), water scrubber(s), electrostatic precipitator(s), or other apparatus.

FIGS. 1-6 show the particle separator 100 generally as a rectangular-shaped box with a horizontal cross-section that is generally square and a vertical cross-section that is generally rectangular. In alternative embodiments, the particle separator 100 can be a square-shaped box, a tube 200 such as shown in FIGS. 7-10b, elbow or bend (e.g., tube with a bend of no more than 90 degrees), or other 3-dimensional shape. FIGS. 1-6 show the particle separator 100 having a bottom with a tapered surface. In alternative configurations, the bottom and/or the top surface of the particle separator 100 may be flat or tapered. In further configurations, the particle separator 100 does not have a top or bottom surface, such as the tube shaped embodiment 200 shown in FIGS. 7-10b.

FIGS. 1-2 show an array of baffles spaced linearly from one another within the particle separator 100 between the inlet 110 and the outlet 120. While the array is shown with 3 baffles in FIGS. 1-2 and 7-8, the array can comprise 2 baffles or more than 3 baffles that are spaced in the particle separator 100. In the embodiments shown in FIGS. 1-2, each baffle 140a, 140b, 140c is a flat rectangular piece of material (see FIG. 6) that is attached along 3 external edges 148 (see FIG. 6) to the inner surface 102 of the particle separator 100. In alternative embodiments, the upstream surface 142 of the baffle may be concave or convex, have an L-shaped cross-section along length L, or have a bend or double bend parallel and adjacent the leading edge 146, whereby the downstream surface 144 or the upstream surface 142 comprises two or more sub-surfaces separated by the bend(s). It is preferred that each baffle is attached in a manner, e.g., welding, sealing, removeably mounted, or the like, that blocks the passage of exhaust between the baffle and the inner surface 102 of the particle separator 100. However, the attachment may not be completely airtight in alternative embodiments.

FIGS. 11a-11b show each baffle 140a, 140b, 140c with a leading edge 146 positioned generally perpendicular to the direction of flow of exhaust entering the particle separator 100. The leading edge 146 has a surface that may be square, rounded or beveled. FIGS. 2b, 10b show the upstream surface 142 positioned at an angle α relative to the inner wall 102 to which it is attached within the particle separator 100, and approximately angle β relative to the linear flow of particle-laden exhaust into the particle separator 100. The angle α can be any angle between about 35-75 degrees, while the angle β can be any angle between about 145-105 degrees. In an embodiment, the angle α is about 40 degrees, while the angle β is about 140 degrees. Each baffle 140a, 140b, 140c may be positioned at angle α and angle β that is the same as or different than the angle α and angle β of other baffle(s).

In embodiments, the angle α is indirectly related to the volumetric flow rate of exhaust flowing through the particle separator 100. For example, the angle α may be lower in cases where the volumetric flow rate is high. Conversely, the angle α may be higher in cases where the volumetric flow rate is low.

Figure 10A:
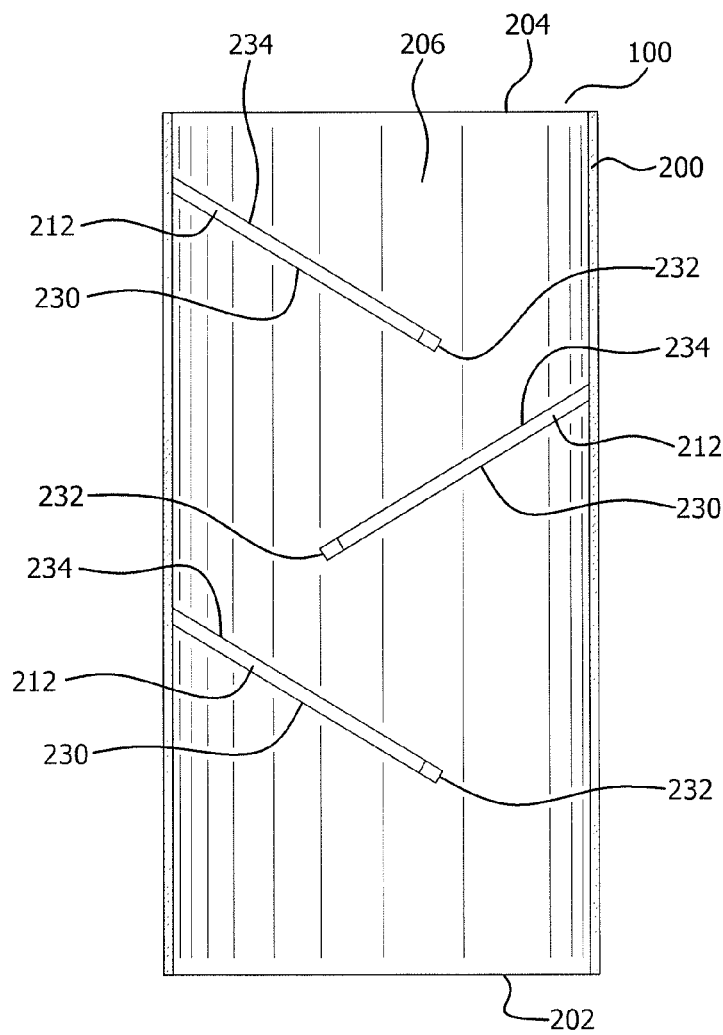
FIGS. 10a, 10b, and 10c show side sectional views of the particle separator shown in FIG. 7.
Figure 10C:
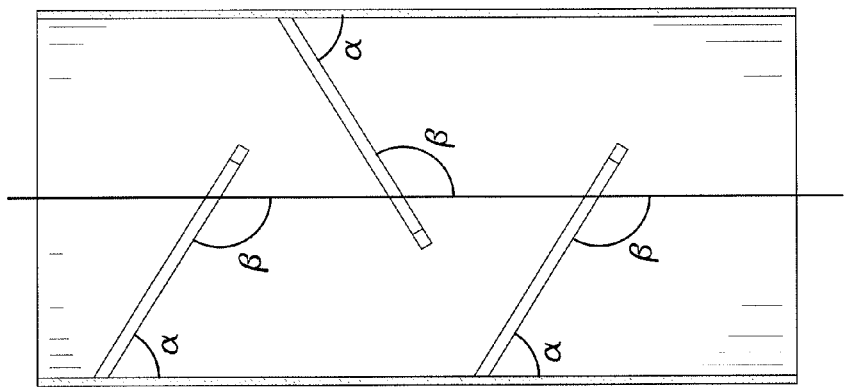
Figure 10B:
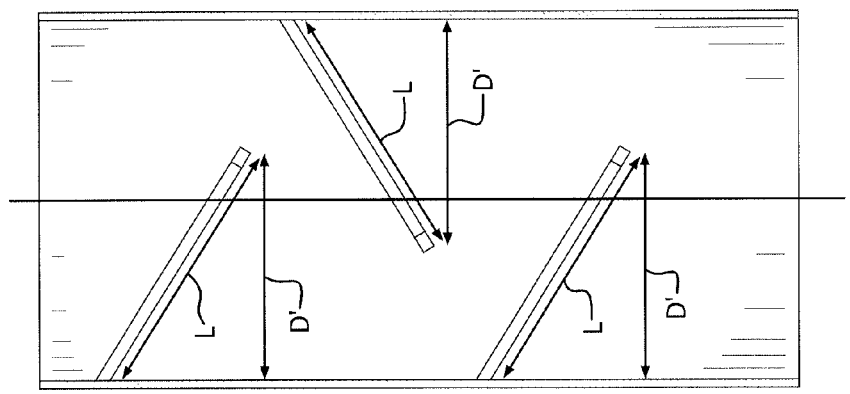

FIGS. 2a, 10a show each baffle 140a, 140b, 140c having a length L that positions the leading edge 146 of the baffle within the flow of exhaust entering the particle separator 100. In the embodiments shown in FIGS. 2a, 10a, the leading edge 146 is distance D from inner surface 102 of the particle separator 100, whereby the leading edge 146 may be equidistant from the opposing inner surface 102. The leading edge 146 of each baffle 140a, 140b, 140c can be positioned along a center horizontal axis of the particle separator 100 (see FIGS. 2a, 10a) of the linear flow of exhaust entering the particle separator 100. In this embodiment, the leading edge 146 on the first baffle 140a redirects about half of the flow of exhaust, while permitting the other half of the flow of exhaust to pass the leading edge 146 of the first baffle 140a onward to the second baffle 140b.

Figure 11C:
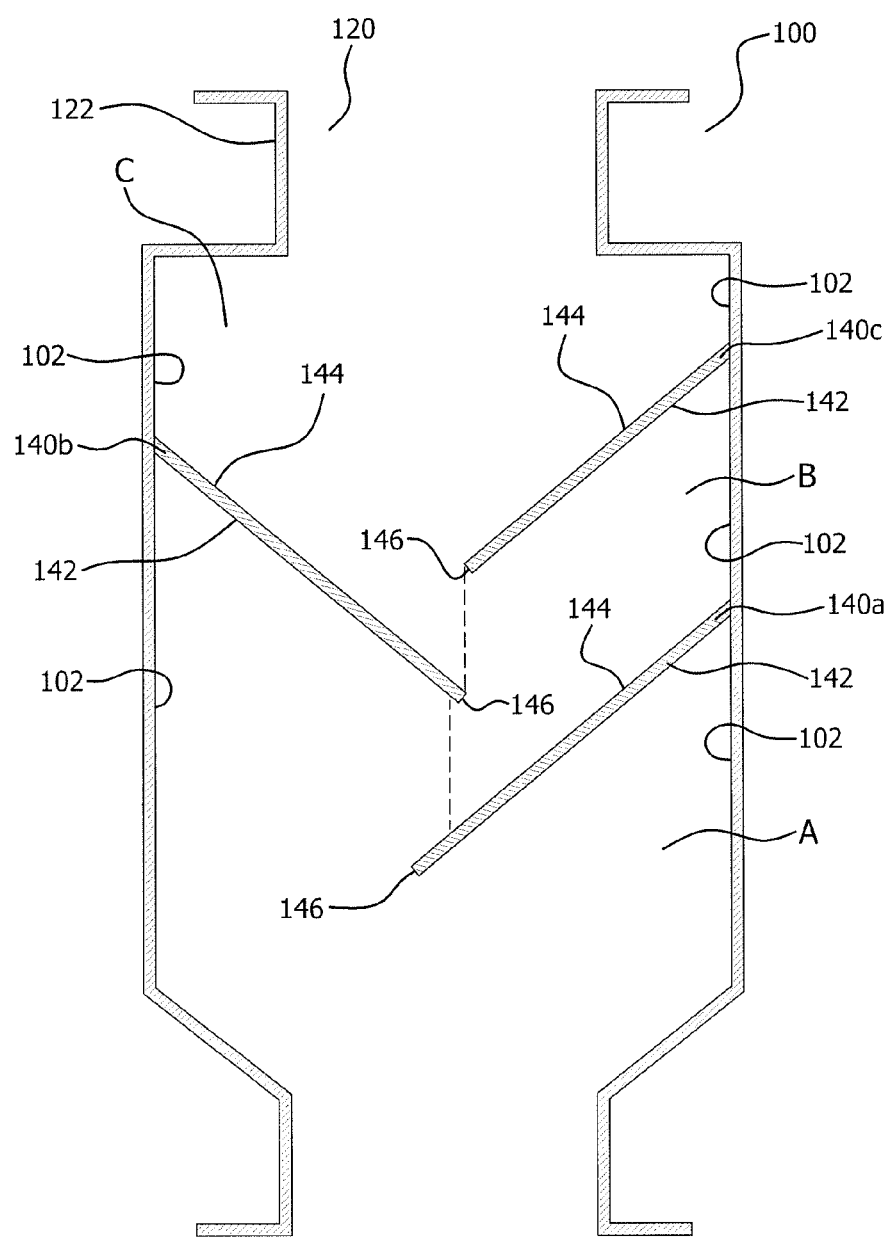
FIG. 11c shows a schematic depicting subchambers of the particle separator.

In alternative embodiments shown in FIGS. 11a and 11c, the leading edge 146 of each baffle 140a, 140b, 140c is positioned at a distance that is greater than distance D from the inner surface 102 on which the edge opposing the leading edge 146 of the baffle is attached. In this configuration, the leading edge 146, which is not equidistant from opposing inner surfaces 102 of the particle separator 100, extends beyond the center of the linear flow of exhaust entering the particle separator 100. The leading edge 146 on the first baffle 140a redirects more than half of the flow of exhaust, as it enters the particle separator 100, while permitting the rest of the flow of exhaust to pass the leading edge 146 and be redirected by the second baffle 140b.

In further embodiments, the leading edge 146 of the first baffle 140a and the second baffle 140b may or may not be equidistant from the inner surface 102 of the particle separator 100. For example, the leading edge 146 of the first baffle 140a and the second baffle 140b are both positioned at distance that is equal to or greater than distance D; the leading edge 146 of the first baffle 140a is positioned at distance D and the leading edge 146 of the second baffle 140*b* is positioned at distance that is greater than distance D; or the leading edge 146 of the first baffle 140*a* is positioned at distance D' and the leading edge 146 of the second baffle 140*b* is positioned at distance D as shown specifically in FIGS. 2*a*, 2*b*.

In the aforementioned configurations, the entire flow of particle-laden exhaust entering into the particle separator 100 will be intercepted and redirected by the upstream surfaces 142 of at least the first and second baffles 140*a*, 140*b*. In an even further embodiment shown in FIG. 12, the first and second baffles 140*a*, 140*b* may be less than distance D and thereby configured to permit a direct linear flow of a portion of the particle-laden exhaust past the first and second baffles 140*a*, 140*b* so long as at least a third baffle 140*c* is provided at distance D' to intercept and redirect the entire portion of the particle-laden exhaust that directly and linearly passes the first and second baffles 140*a*, 140*b*.

In all embodiments, the array of baffles are arranged within the particle separator 100 in a manner that prevents exhaust from flowing directly linearly from the inlet 110 to the outlet 122.

FIGS. 1-2 and 7-8 show a third baffle 140*c* linearly spaced downstream from the second baffle 140*b*. The third baffle 140*c* redirects the flow of exhaust and provides an upstream surface 142 onto which particles can impact and collect downstream from the first and second baffles 140*a*, 140*b*. Downstream from the second baffle 140*b* the flow of exhaust is turbulent, and also non-linear. In further embodiments, additional baffles may be linearly spaced within the particle separator 100. The third baffle 140*c* shown in FIGS. 1-2, 7-8, as well as any additional baffle(s), are also attached to the inner surface 102 of the particle separator 100 in the same manner and position as the first and second baffles 140*a*, 140*b*. Each of these baffles may be spaced such that the leading edge 146 is equal to, greater than or less than distance D from the inner surface 102 on which the edge opposing the leading edge 146 of the baffle is attached.

FIG. 11*c* shows subchambers A, B, C defined by the baffles within the particle separator 100. The first subchamber A is generally the space within the particle separator 100 that is upstream from the first and second baffles 140*a*, 140*b*. The second subchamber B of the particle separator 100 is generally the space between the downstream surface 144 of the first baffle 140*a* and the upstream surface 142 of the third baffle 140*c*. Finally, the third subchamber C is generally the space in the particle separator 100 that is downstream from the downstream surfaces 144 of the second and third baffles 140*a*, 140*b*. Alternative configurations of the array of baffles will change the number of chambers as would be apparent to one of skill in the art.

FIG. 11*a* shows an airflow schematic for the exhaust as it is diverted by the baffles 140*a*, 140*b*, 140*c* while passing through the particle separator 100. FIGS. 11*a*, 11*b* show the change in the particle density of the exhaust as it contacts the baffles 140*a*, 140*b*, 140*c* while passing through the particle separator 100 and the locations where particles impact the upstream surfaces of the baffles 140*a*, 140*b*, 140*c* and build up. This shows that the density of particles in the exhaust is generally concentrated in the first subchamber A of the particle separator 100. The exhaust from the outlet 120 has a significantly reduced particle content, if any at all. The particle separator 100 reduces the particle content of outlet exhaust by no less than 80% of untreated particle-laden exhaust that is directly blown off from a preconditioner.

Although the initial flow of particle-laden exhaust into the first subchamber A may be entirely diverted by the first and second baffles 140*a*, 140*b*, the turbulence of airflow in the first subchamber A forces exhaust with a density that is substantially less than that of the initial flow of particle-laden exhaust to circulate outside of the primary flow of exhaust into the first subchamber A and then pass into the second chamber B so that less-dense, particle-laden exhaust is redirected by the third baffle 140*c*. This provides conditions for particles to impact the upstream surface 142 of the third baffle 140*c* and the inner surface 102 of the particle separator 100 before circulating into the third subchamber C and then out of the outlet 120.

FIG. 1 shows an access door 130 for cleaning the baffles 140*a*, 140*b*, 140*c* and inner surfaces 102 of the particle separator 100. The access door 130 can be attached by a hinge 132 and lock 134 with a handle and includes a seal 136, such as a rubber gasket or high temperature resistant silicon gasket, to create an airtight seal between the door 130 and the particle separator 100 when the door 130 is closed. The door 130 can be opened by rotating the handle and releasing the lock 134 to provide access to the interior of the particle separator 100. This permits the surfaces of the baffles and the inner surfaces 102 of the particle separator 100 to be scraped and/or washed to remove buildup of particles on those surfaces. In certain embodiments, the baffles can be removed for cleaning if configured to do so.

The particle separator 100 is self-cleaning. For example, the angle α, optionally combined with a slick coating applied to the upstream and/or downstream surfaces 142, 144, promotes the drainage of moisture and particles from those surfaces during and after operation, even if the upstream surface 142 has a rough surface coating applied to it. The particle separator 100 can also be cleaned by running the steam injectors at a high rate through the preconditioner in the absence of starting ingredients to steam clean the internal surfaces of the particle separator 100.

In a non-limiting embodiment, the particle separator 100 comprises a rectangular box-shaped enclosure defining an enclosed space 104 having an inlet 110 with a tube 112 about 4 inches long and an outlet 120 with a tube 122 about 4 inches long. The tubes 112, 122 are about 8 inches in diameter. The enclosure is about 18 inches tall and about 12-14 inches square across a horizontal cross-section. The bottom of the enclosure is tapered outward from the inlet 110 to the walls of the enclosure. Three baffles are provided whereby the leading edges of the baffles are linearly spaced apart by about 3-4 inches. Each baffle is generally flat and has a dimension that is about 14 inches by 8 inches. The particle separator 100 includes a door 130 that is about 12 inches wide and about 16 inches tall and is used to close an opening into the particle separator that is smaller in dimension than the door. This embodiment of the invention, along with all other embodiments, is configured to engage a vent stack from a preconditioner or other equipment. The length of the vent stack is not critical and can be about 4 feet long in an embodiment.

FIGS. 7-8, 10*a*-10*b* show an alternative embodiment of the particle separator 100 comprising a tube 200 with baffles 210*a*, 210*b*, 210*c* linearly spaced within the tube 200. The diameter of the tube 200 is not critical as it may be larger or smaller than, or the same as, the diameter of the vent pipe of the preconditioner or other equipment. The tube 200 may be straight or bent at an angle that is no more than 90 degrees. The tube 200 may include at least one taper to increase or decrease the diameter of the tube 200 relative to the diameter of the vent of the preconditioner or other equipment. For example, the tube 200 may have a taper to reduce the diameter of the tube 200 upstream from the baffles. This reduction will cause the exhaust flow to accelerate before reaching the baffles. The tube 200 will have an inlet end 202 that is configured to attach to the vent and an outlet end 204 that is configured to optionally attach to pipe(s) and/or one or more downstream particle separator(s), filter(s), stack(s), water scrubber(s), electrostatic precipitator(s), or other apparatus.

Figure 9:
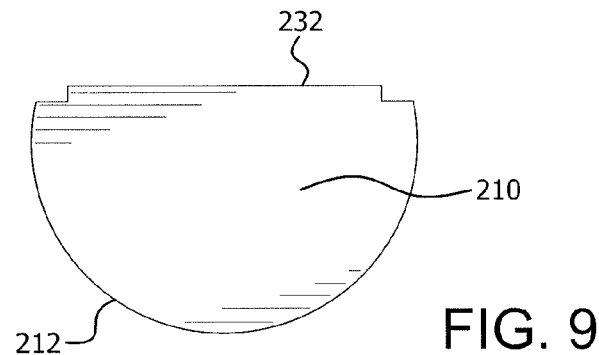
FIG. 9 shows a top view of a baffle used with the particle separator shown in FIG. 7.

FIGS. 7-9 show that each baffle 210a, 210b, 210c comprises a partial circular edge 212 having an external contour that contacts the inner surface of the tube. The baffle can be adhered or welded to the inner surface 206 or be removeably attached thereto so long as the contact between the partial circular edge 212 and the tube 200 is substantially sealed to prevent flow of exhaust therebetween. Each baffle 210a, 210b, 210c in this alternative configuration would be positioned relative to the tube 200 and inflow of particle-laden exhaust in a similar manner as the configuration for the particle separator 100 shown in FIGS. 1-2. For example, the angle α shown in FIG. 10c can be any angle between about 35-75 degrees, while the angle β can be any angle between about 145-105 degrees. Referring now to FIG. 10b, the length L of the baffles 210a, 210b, 210c and the distance D' of baffles from the inner surface 206 of the tube 200, including the alternative embodiments thereof, would be similar to those of the particle separator 100 in FIGS. 1-2, which are configured so that the entire flow of particle-laden exhaust entering into the particle separator 100 will be intercepted and redirected by the upstream surfaces 230 and leading edge 232 of the first and second baffles 210a, 210b, which block direct linear flow of exhaust from the inlet 202 to the outlet 204.

The particle separator 100 and its components may be made of metal, metal alloys, ceramic, or polymeric material. The choice of material for the particle separator 100 and its components depends on the required material properties or environmental conditions for the intended use of the particle separator 100 that would include consideration of exposure to heat, high moisture, and airflow pressure. Metallic materials, such as stainless steel, are better suited for high temperatures, while polymeric materials may be preferred for cost reasons so long as it would be resistant to thermal loads placed on the particle separator 100.

The particle separator 100 can be used in connection with other commercial and industrial operations that require the removal of particles from a flow of air or gas. Any such use is not limited solely to manage exhaust from a preconditioner for an extruder. For example, the particle separator 100 can be used in connection with any food processing apparatus that injects steam into an operation. The particle separator 100 can be used to scrub particles from any gas stream in an operation. In an application, the particle separator 100 can be positioned in an operation as a pre-cleaner to scrub air or gas flow of particles before the air or gas is introduced to an operation downstream from the particle separator 100. In this operation, the particle separator 100 can scrub a gas flow before the gas is introduced into a combustion chamber, such as in an internal combustion engine or turbine. A person of ordinary skill in the art will appreciate the opportunities for use of the particle separator 100 in different fields of application.

While this subject matter has been disclosed with reference to specific embodiments, it is apparent that other embodiments and variations can be devised by those skilled in the art without departing from the true spirit and scope of the subject matter described herein. The appended claims include all such embodiments and equivalent variations.

What is claimed is:

1. A device for removing particles from exhaust emissions of an extrusion system comprising:
   an enclosure comprising an inlet, an outlet, and a first inner surface at a first distance from an opposing second inner surface, said enclosure is configured to channel a flow of exhaust emissions from said inlet through said enclosure to said outlet;
   a first baffle having an upstream surface at an acute angle to said first inner surface and a first leading edge positioned from said first inner surface at a second distance that is equal to or greater than one half of said first distance;
   a second baffle having an upstream surface at an acute angle to said second inner surface and a second leading edge positioned from said second inner surface at said second distance; and
   a third baffle having an upstream surface at an acute angle to said first inner surface and a third leading edge positioned from said first inner surface at said second distance;
   wherein said first leading edge is spaced from said second leading edge at a vertical distance that is less than a diameter or width of said inlet, and whereby said first leading edge, said second leading edge, and said first and said second inner surfaces of said enclosure define an opening having an average area that is about 65 to about 100% of a cross sectional area of said inlet, and
   wherein said second leading edge is spaced from said third leading edge less than said vertical distance.

2. The device of claim 1 wherein at least one of said first baffle, said second baffle, and said third baffle is sealed along an external edge to said particle separator.

3. The device of claim 1 wherein said acute angle is in a range of about 35-75 degrees.

4. The device of claim 1 wherein at least one of said upstream surfaces of said first baffle, said second baffle, and said third baffle is flat, convex, or concave, or has a cross section that can be L-shaped.

5. The device of claim 1 wherein at least one of said first leading edge, said second leading edge, and said third leading edge has a surface that is flat, rounded, or beveled.

6. The device of claim 1 wherein at least one of said first leading edge, said second leading edge, and said third leading edge is linear, curvilinear, notched, or any combination thereof.

7. The device of claim 1 wherein at least one downstream surface of said first baffle, said second baffle, and said third baffle is coated with a rough coating or a slick coating.

8. The device of claim 1 wherein a combination of said upstream surfaces of said first baffle and said second baffle provides a surface area that is greater than a horizontal cross-sectional area of said enclosure.

9. A particle separator for removing particles from exhaust of a food manufacturing apparatus, said particle separator comprising:
   a first baffle having an upstream surface at an acute angle to a first inner surface of said particle separator and a first leading edge, said first leading edge at a first distance from said first inner surface that is equal to or less than one half of an interior distance between said first inner surface and an opposing second inner surface of said particle separator,
   a second baffle having an upstream surface at an acute angle to said second inner surface and a second leading edge, said second leading edge at a second distance from said second inner surface that is equal to or less than one half of said interior distance, and
   a third baffle having an upstream surface at an acute angle to said first inner surface and a third leading edge, said third leading edge at a third distance from said first inner surface that is equal to or greater than one half of said interior distance, wherein said first baffle is upstream from said second baffle, and said second baffle is upstream from said third baffle, and an inlet provided upstream from said first baffle, and an outlet provided downstream from said third baffle, wherein said first leading edge and said second leading edge are spaced from one another at a first vertical distance that is equal to or less than a diameter or width of an opening of said inlet and are configured to redirect a first portion of a linear flow of said exhaust and to permit passage of a second portion of said linear flow of said exhaust, and wherein said third leading edge is spaced from said second leading edge at a second vertical distance that is greater or less than said first vertical distance, said upstream surface of said third baffle is configured to intercept and redirect said second portion of said linear flow of said exhaust, whereby said first baffle, said second baffle, and said third baffle are configured to block said first portion and said second portion of said linear flow of said exhaust from passing directly from said inlet to said outlet.

10. The particle separator of claim 9 wherein at least one of said first baffle, said second baffle, and said third baffle is sealed along an external edge to said particle separator.

11. The particle separator of claim 9 wherein said acute angle is in a range of about 35-75 degrees.

12. The particle separator of claim 9 wherein at least one of said upstream surfaces of said first baffle, said second baffle, and said third baffle is flat, convex, or concave, or has a cross section that can be L-shaped.

13. The particle separator of claim 9 wherein at least one of said first leading edge, said second leading edge, and said third leading edge has a surface that is flat, rounded, or beveled.

14. The particle separator of claim 9 wherein at least one of said first leading edge, said second leading edge, and said third leading edge is linear, curvilinear, notched, or any combination thereof.

15. The particle separator of claim 9 wherein at least one downstream surface of said first baffle, said second baffle, and said third baffle is coated with a rough coating or a slick coating.

16. The particle separator of claim 9 wherein a combination of said upstream surfaces of said first baffle and said second baffle provides a surface area that is greater than a horizontal cross-sectional area of said particle separator.

17. The particle separator of claim 9 wherein said first leading edge is spaced from said second leading edge at said first vertical distance that is less than a diameter or width of said inlet, and whereby said first leading edge, said second leading edge, and inner surfaces of said particle separator define an opening having an average area that is about 65 to about 100% of a cross sectional area of said inlet.

* * * * *